United States Patent Office 3,492,235

Patented Jan. 27, 1970

3,492,235

MAGNETIC RECORDING MEDIUM AND METHOD OF MAKING SAME

Kengo Matsumoto and Minoru Nishida, Tokyo, Japan, assignors to Sony Corporation, Tokyo, Japan, a corporation of Japan No Drawing. Filed Dec. 17, 1965, Ser. No. 514,662
Claims priority, application Japan, Dec. 30, 1964, 40/46
Int. Cl. H01f *1/06;* G11b *5/72*
U.S. Cl. 252—62.54 6 Claims

ABSTRACT OF THE DISCLOSURE

A magnetic composition for coating the non-magnetic base of a magnetic recording medium consists essentially of a powdered magnetic material, such as gamma-iron oxide or an alloy consisting of 30–70 wt. percent iron, 40–80 wt. percent cobalt and 0–20 wt. percent nickel, and a binder together with from about 0.5 to about 20 parts per 100 parts of magnetic material of a high molecular weight hydrocarbon lubricant containing from about 18 to about 30 carbon atoms, such as squalene, squalane, pristane, eicosane, mixtures thereof, and mixtures of the foregoing with ester lubricants selected from the group consisting of stearyl butyrate ester, stearyl stearate ester and stearyl laurate ester.

This invention relates to magnetic recording media, more particularly, to a magnetic composition for use in producing magnetic recording media suitable for use in video recording or in a computer device.

In a magnetic video tape recording apparatus (VTR) the relative velocity between the magnetic medium and the magnetic head is extremely high, for example, about 1500 inches per second (38 meters per second) with the result that the abrasion and life of the tape and the abrasion of the magnetic head are problems of prime importance.

In order to solve these problems, various lubricated magnetic compositions for recording media such as tapes, have recently been proposed.

It is an object of the invention to provide a self-lubricating magnetic composition for use in the production of recording media having a high degree of abrasion resistance and a long life.

Another object of this invention is to provide a composition for use in the production of magnetic media for magnetic video tape recording use having high sensitivity and excellent frequency characteristics.

Another object of this invention is to provide a magnetic media composition for use in computer devices having good frequency characteristics and small drop-out phenomena.

These and other objects of the invention are realized by providing magnetic compositions utilizing high molecular weight hydrocarbons especially those obtainable from animal and vegetable sources such as squalene as lubricants. Suitable lubricants include saturated and unsaturated aliphatic hydrocarbons containing from about 18 to about 30 carbon atoms. Squalene, squalane, pristane and eicosane may be mentioned by way of example. Mixtures of lubricants may be employed if desired.

The lubricant is mixed with a powdered magnetic material such as gamma-iron oxide or an iron-cobalt-nickel composition in an amount which may vary from about 0.5 to 20 parts of lubricant per 100 parts of magnetic material. The mixture will also contain an adhesive binder.

Any of the usual binder materials usually employed in the production of recording media can be used and in generally the same proportions. Thermoplastic resins such as polyvinyl chloride polyvinyl acetate copolymers, polyvinyl acetate, polyacrylic esters, such as polybutyl acrylate and polyvinyl chloride are especially suitable, although thermosetting systems such as polyurethanes and epoxy resins can also be employed. Mixtures of two or more binders are also useful.

In use, the composition is taken up in a liquid carrier to form a dispersion which is coated on a nonmagnetic base such as a plastic tape or sheet film. Evaporation of the liquid carrier deposits the magnetic compositions with the magnetic particles and the lubricant dispersed throughout the binder on the non-magnetic base as a thin layer, for example, up to about ten microns in width to provide a magnetic recording medium having high abrasive resistance and longer life.

If too much lubricant is used, the composition may tend to break away from the non-magnetic base. Furthermore, with relatively larger amounts of lubricant in those cases where the recording media is used at lower ambient temperatures, there occurs the so-called blooming phenomenon in which the surface of the magnetic layer becomes rough and uneven and the magnetic powder sticks to the magnetic head with the result that sensitivity is low. If too little is used, the result is substantially the same as if no lubricant at all were used.

Any of a number of relatively volatile liquid carriers may be employed in using the compositions of this invention. Both aliphatic and aromatic liquids are suitable. Hydrocarbons such as toluene and oxygenated aliphatic liquids especially ketones such as methyl ethyl ketone are suitable.

The lubricants utilizable in this invention are known compounds which are readily available from known sources. Squalene and pristane, for example, are readily available from fish liver oils, such as shark oil by well known procedures.

As illustrated in the examples, the hydrocarbon lubricants of this invention can be used alone or in association with other lubricants, especially the ester lubricants described and claimed in copending application Ser. No. 511,339 filed Dec. 13, 1965 now abandoned, and assigned to the same assignee as this invention. The ester lubricants include those produced by reaction between a pure monobasic fatty acid or a mixture of two or more monobasic fatty acids containing from about 2 to about 18 carbon atoms and a monohydroxy aliphatic alcohol containing more than 14 carbon atoms. The reactants may be unsaturated, but preferably they are saturated. Typical examples include stearyl butyrate, stearyl stearate and stearyl laurate.

The following non-limiting examples are given by way of illustration only.

EXAMPLE I 20 g. of squalene ($C_{30}H_{50}$) is mixed with 200 g. of powdered acicular magnetic gamma-iron oxide ($\gamma$-$Fe_2O_3$) and 55 g. of vinyl chloride vinyl acetate copolymer. It is taken up in 250 g. of methyl ethyl ketone to form a dispersion which is coated on a polyester film base. Evaporation of the liquid produces a magnetic recording tape or sheet in which the magnetic composition is deposited on the surface of the non-magnetic base.

Tapes or sheets prepared in accordance with this example are compared with standard tapes similarly prepared by repeatedly seaming one portion of each tape at similar rates with a magnetic head to produce a picture and measuring the time intervals until the picture produced by each of the respective tapes begins to deteriorate. This is standard still test often employed to test the quality of magnetic recording media. With tapes containing known lubricants such as silicone oil, graphite, molybdenum disulfide and the like, deterioration is generally observed within 30 to 60 seconds. If no lubricant is used, deterioration is observed within a few seconds. With tapes of this example, there is no observable deterioration for 1200 seconds or even longer. Moreover, the amount of wear on the media itself is less than one-tenth of that observed with previously known tapes. Substantially the same results are obtained utilizing squalane in place of the squalene in the composition of this example.

EXAMPLE II

A composition similar to that of Example I but containing only 0.5% by weight of the lubricant based on the amount of magnetic powder is used to prepare a magnetic recording tape. The deterioration time as measured using the procedure of Example I is about 300 seconds.

EXAMPLE III

A lubricant is prepared from a 1:1 mixture of squalene and pristane ($C_{18}H_{38}$). This lubricant is used to prepare a magnetic composition containing 10 g. of lubricant (5%), 50 g. of a binder and 200 g. of a powdered magnetic mixture containing 48% iron, 50% cobalt and 2% nickel. The mixture is taken up in 250 g. of toluene and the suspension is coated on a tape base. The liquid is evaporated to provide a magnetic recording tape having substantially the same favorable properties of the novel tapes of the previous examples.

The substitution of eicosane ($C_{20}H_{42}$) for pristane in this example provides a lubricant yielding similar results.

Similar results are obtained with other binary and ternary alloys containing, by weight: iron 30–70%, cobalt 40–80% and nickel 0–20% with the lubricants of this example.

EXAMPLE IV

Tapes are prepared using compositions containing 10 g. of squalene and 10 g. stearyl laurate ester $$(C_{11}H_{23}COOC_{18}H_{37})$$

200 g. of gamma-iron oxide and 40 g. of polyvinyl chloride binder. Methyl ethyl ketone (250 g.) is used as the liquid carrier with each composition. Results similar to those observed in Example I are obtained.

What is claimed is:

1. A magnetic composition consisting essentially of a powdered magnetic material and a binder together with from about 0.5 to about 20 parts per 100 parts, by weight, of said magnetic material of a high moleculer weight lubricant selected from the group consisting of squalene, squalane, pristane, eicosane, mixtures thereof and mixtures of the foregoing with ester lubricants selected from the group consisting of stearyl butyrate ester, stearyl stearate ester and stearyl laurate ester.

2. A magnetic composition according to claim 1, in which said magnetic material is gamma-iron oxide.

3. A magnetic composition according to claim 1, in which said magnetic material is an alloy consisting essentially of 30.70 wt. percent iron, 40.80 wt. percent cobalt and 0–20 wt. percent nickel.

4. A magnetic recording medium comprising a nonmagnetic base coated with a magnetic composition consisting essentially of a powdered magnetic material and a binder together with from about 0.5 to about 20 parts per 100 parts, by weight, of said magnetic material of a high molecular weight lubricant selected from the group consisting of squalene, squalane, pristane, eicosane, mixtures thereof, and mixtures of the foregoing with ester lubricants selected from the group consisting of stearyl butyrate ester, stearyl stearate ester and stearyl laurate ester.

5. A magnetic recording medium according to claim 4, in which said magnetic material is gamma-iron oxide.

6. A magnetic recording medium according to claim 4, in which said magnetic material is an alloy consisting essentially of 30–70 wt. percent iron, 40–80 wt. percent cobalt and 0–20 wt. percent nickel.

References Cited

UNITED STATES PATENTS

| | | | |
|---|---|---|---|
| 3,144,352 | 8/1964 | Talley | 252—62.54 |
| 3,274,111 | 9/1966 | Sada et al. | 252—62.54 |
| 3,398,011 | 8/1968 | Neirotti et al. | 117—237 X |
| 3,387,993 | 6/1968 | Flowers | 117—144 X |

ROBERT D. EDMONDS, Primary Examiner

J. COOPER, Assistant Examiner

U.S. Cl. X.R.

117—160, 235, 237, 240; 252—62.51